INVENTOR
WALTER M. HEYMANN
BY
ATTORNEYS

March 11, 1969  W. M. HEYMANN  3,431,955
AUTOMATIC FRUIT SECTIONING APPARATUS
Filed April 4, 1966  Sheet 4 of 5

INVENTOR
WALTER M. HEYMANN

BY
ATTORNEYS

March 11, 1969 W. M. HEYMANN 3,431,955
AUTOMATIC FRUIT SECTIONING APPARATUS
Filed April 4, 1966 Sheet 5 of 6

INVENTOR
WALTER M. HEYMANN
BY
ATTORNEYS

United States Patent Office 3,431,955
Patented Mar. 11, 1969

3,431,955
AUTOMATIC FRUIT SECTIONING APPARATUS
Walter M. Heymann, 211 W. 61st St.,
New York, N.Y. 10023
Filed Apr. 4, 1966, Ser. No. 540,021
U.S. Cl. 146—3                5 Claims
Int. Cl. B26d 1/28, 1/44, 3/00

ABSTRACT OF THE DISCLOSURE

The specification discloses a rotatable fruit holder on each side of a motor housing. By means of chain linkages the motor causes two shafts to reciprocate. One shaft causes a sectioning knife to move into and out of the fruit contained by the holders and the second reciprocating shaft causes the holders to rotate in one direction, there being provided a flexible member and a holding spring to prevent turning in the reverse direction. A manually operated device is provided to core the fruit. The holders are arranged to slide into cutting position where switches are closed to start operation of the sectioning apparatus which automatically shuts off when the sectioning is completed.

---

This invention relates to cutting apparatsu and, in particular, to such apparatus that is particularly adapted to cut and slice fruit and other articles of human consumption.

One object of the invention is to provide an improved fruit sectioner and corer.

Another object of the device is to provide an improved fruit sectioner and corer of automatic operation.

A further object is to provide a fruit sectioning device capable of sectioning equal segments by reciprocating knives and employing revolving fruit holders and automatically shutting down after the segments have been sectioned.

Other objects and advantages of the invention may be appreciated on reading the following detailed description of one embodiment thereof which is taken in conjunction with the accompanying drawings, in which FIG. 1 is a front view in elevation of the invention taken on line 1—1 of FIG. 2 with certain parts broken away.

Figure 1:
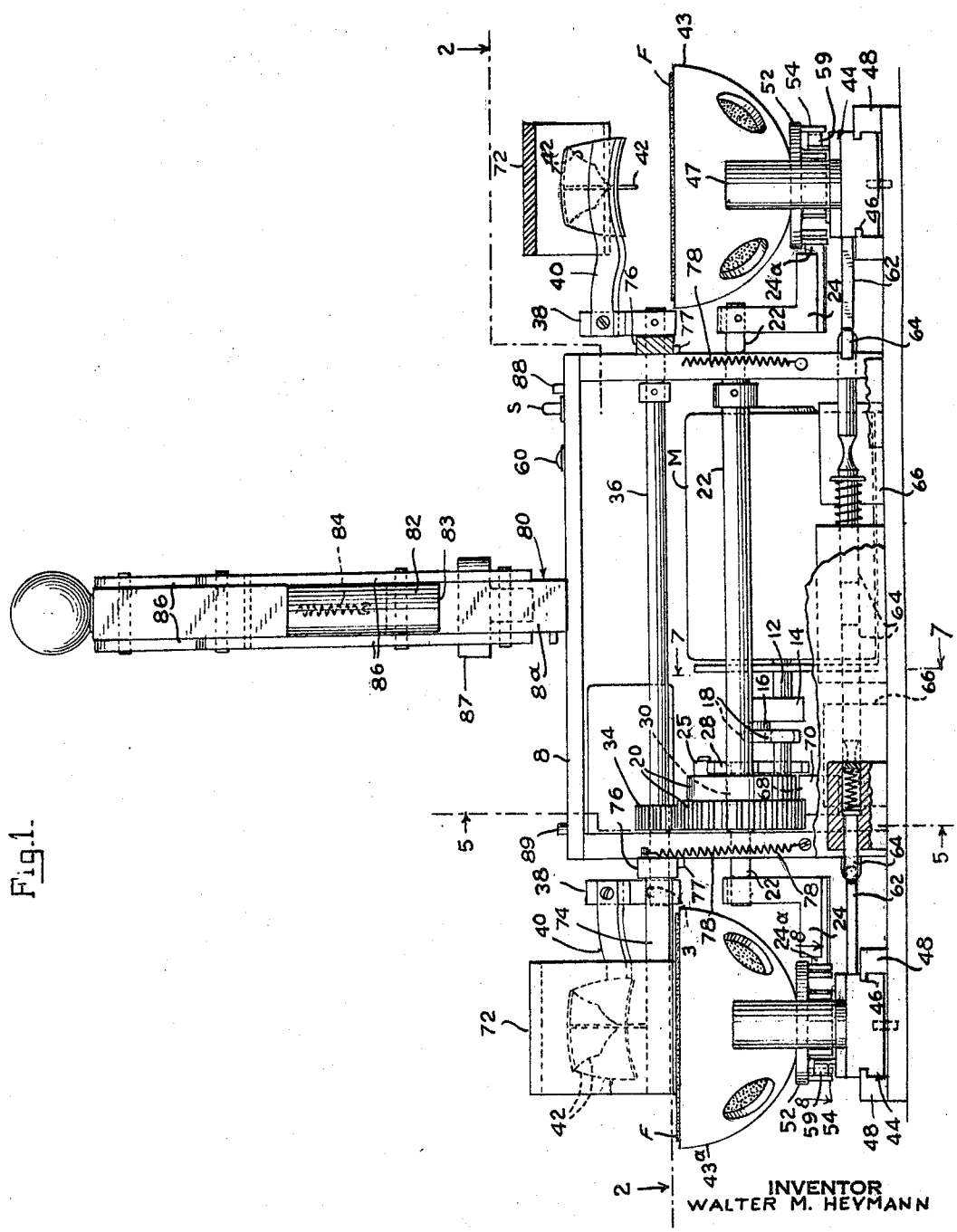

It is the purpose of the device to core and section fruit such as grapefruit and oranges. The sectioning is effected in equal segments, normally twelve in number, by rotating the fruit a full revolution intermittently in synchronism with a reciprocating knife which cuts the fruit into the equal sections.

Referring to the drawings the sectioning device is provided with a motor M which is supported in housing 8 on base 10 and is adapted to run in one direction. The motor is employed to rotate both halves of the fruit and reciprocally drive sectioning knives operating on both halves simultaneously.

There is mounted on armature shaft 12 of the motor M, a crank arm 14 to which there is connected through journal crank pin 16 a crank link 18. The link 18 is connected in turn to the hub of a gear 20 mounted on reciprocating shaft 22. A pawl arm 24 to which there is attached in face to face relation a spring feed pawl 24a is mounted on extentions of the shaft 22 exteriorly of the housing 8 on each side thereof. The employment of the reciprocating pawl arms to turn cups bearing the fruit is described below.

Figure 2:
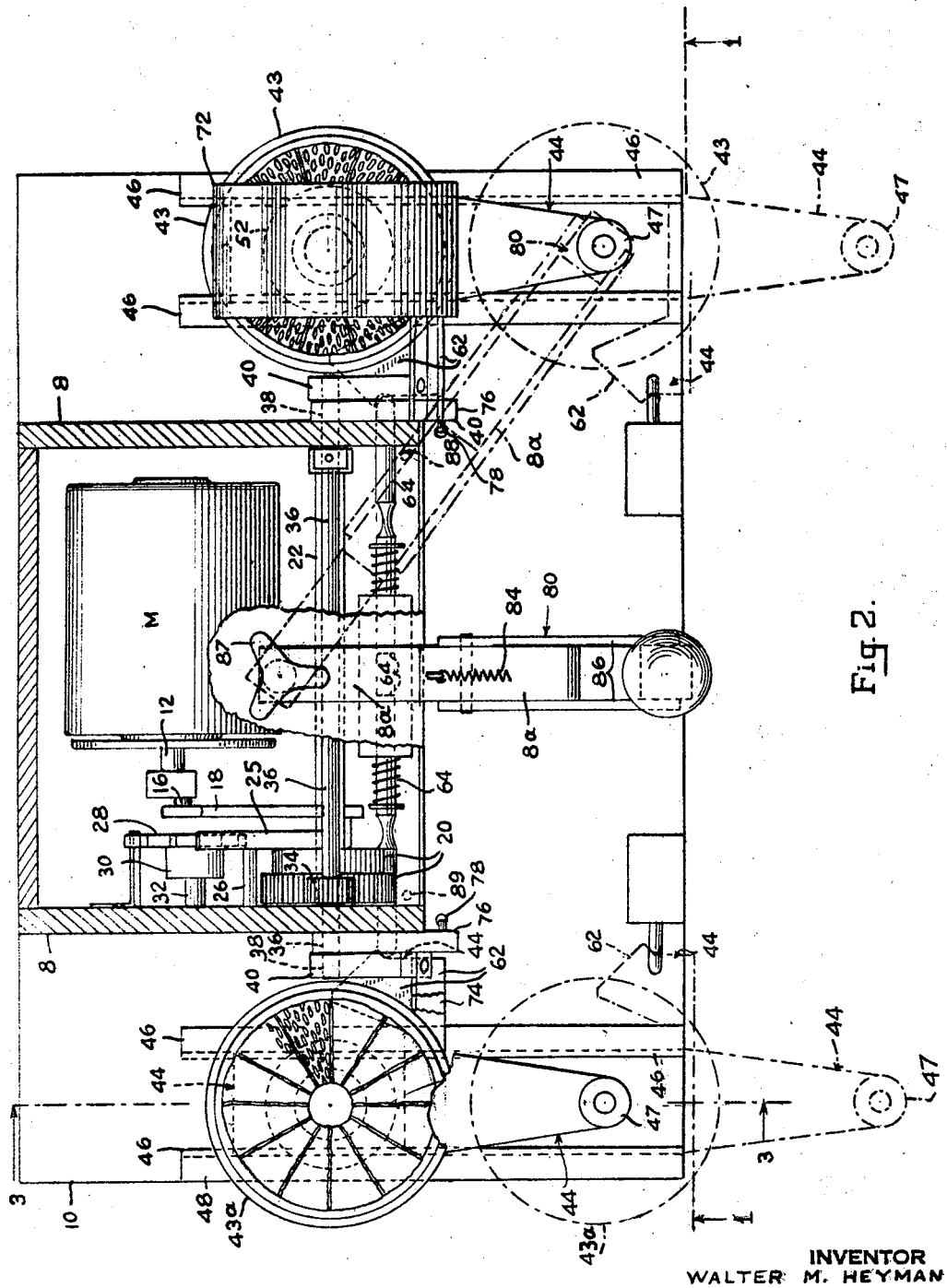
FIG. 2 is a plan view taken on line 2—2 of FIG. 1 with certain parts broken away and the corer mechanism shown in full in a dotted line position.

A ratchet pawl 25 engaging support pin 26 and ratchet wheel 28 is also reciprocated on the hub of gear 20 as shown in FIG. 2, serving to turn action stop cam 30 mounted on ratchet shaft 32 for the reason explained hereinafter.

Pinion 34 is reciprocally driven by gear 20 and is mounted on reciprocating shaft 36 which extends through both sides of the housing 8, there being secured to its exterior extremities, connecting members 38, knife support arms 40 and knives 42, which effect by reciprocal action the desired sectioning of the grapefruit or other fruit.

Figure 3:
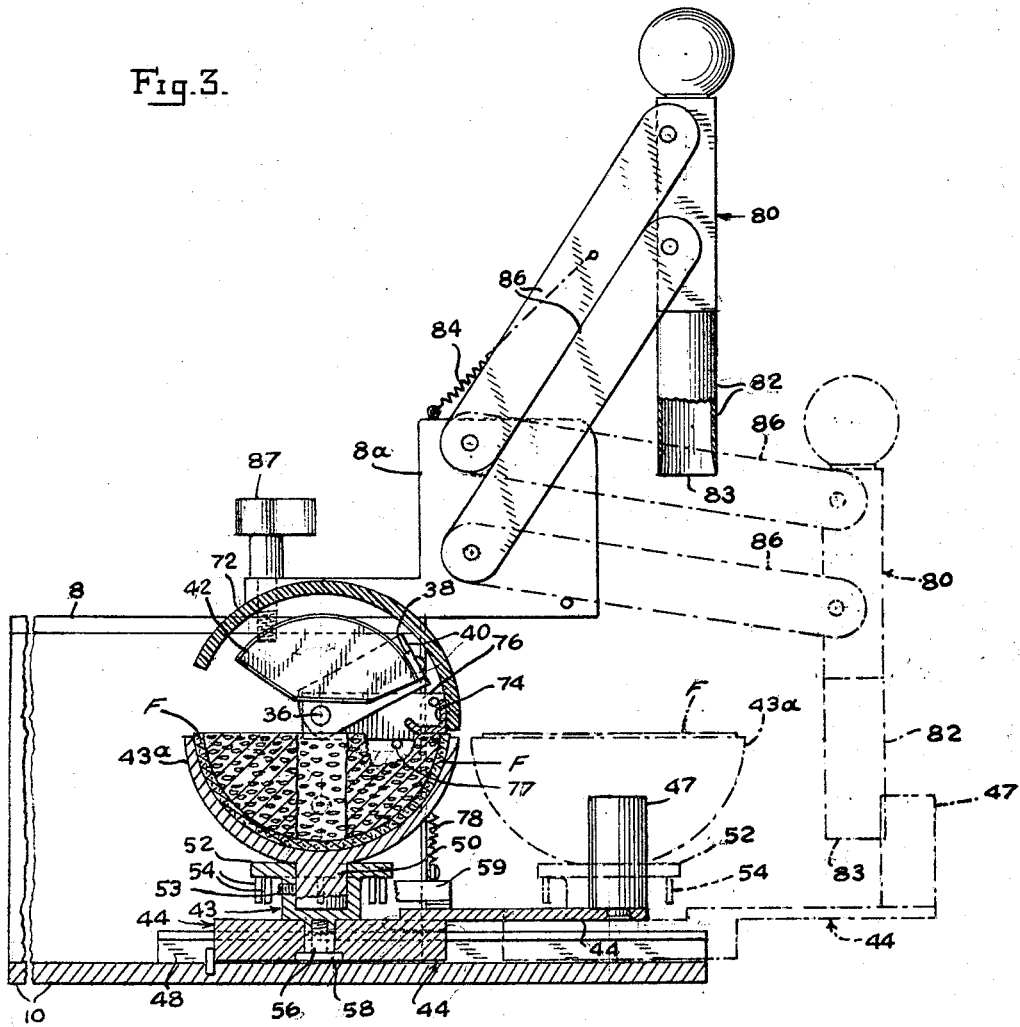
FIG. 3 is a transverse vertical section taken on line 3—3 of FIG. 2 with certain parts omitted and certain parts broken away, the corer shown in up position.
Figure 4:
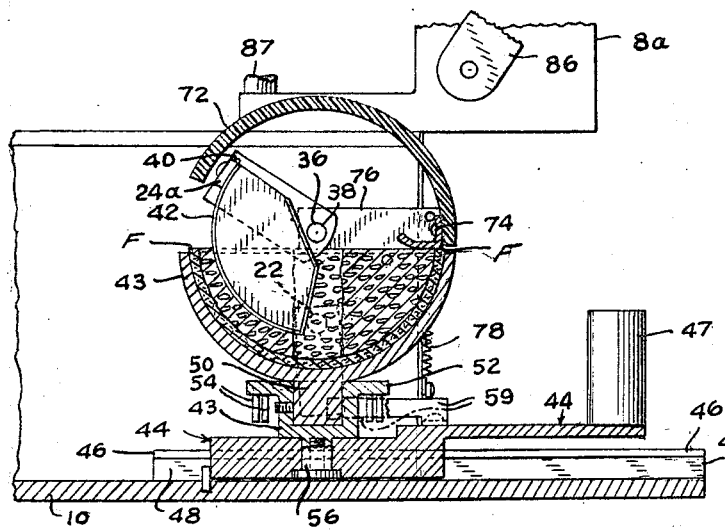
FIG. 4 is a similar section to FIG. 3, but with the fruit sectioning knife in cutting position.
Figure 5:
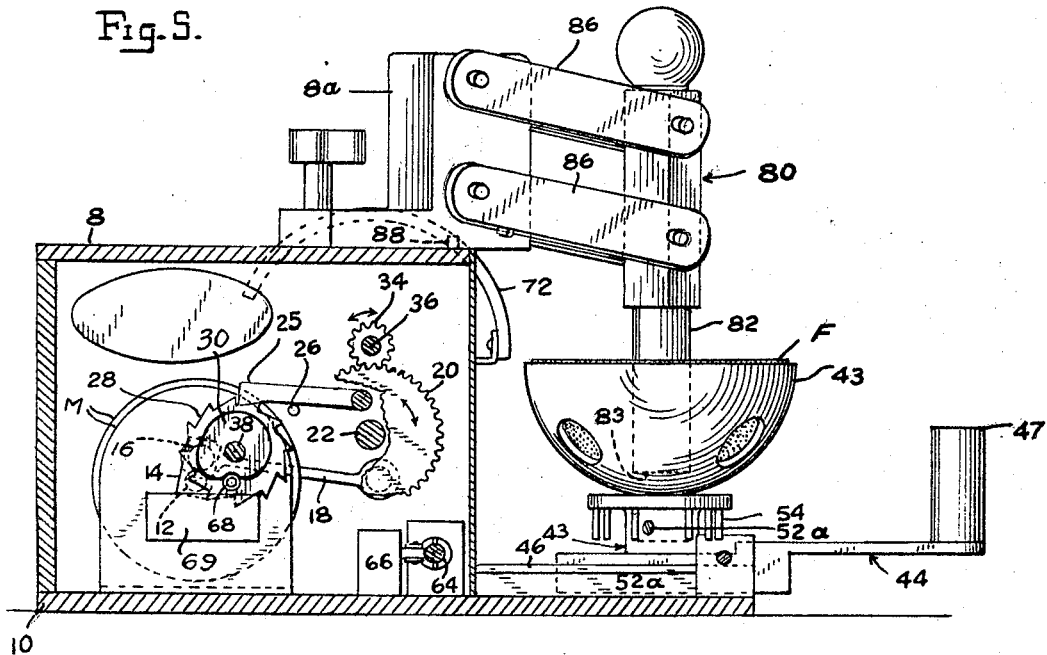
FIG. 5 is a vertical section taken on line 5—5 of FIG. 1 with the corer in coring position.

On each side of the housing 8a grapefruit cup holder 43 is supported on a slide member 44 which is grooved to receive lateral bar rails 46 of channel members 48. As shown in FIG. 3 and FIG. 4, the cup holders 43 have a reduced bottom extension 50 received by rotatable support 52 having peripherally arranged pusher elements 54 depending therefrom. Integrally depending from the underside of the rotatable support 52 is a turning shaft 56 the end of which is capped at 58 within a recess provided in the underside of the slide member 44. Secured to the top of each slide member 44 is a holding spring 59, the end of which yieldingly engages the pusher elements 54 being shaped to permit the pusher elements of each cup support to rotate in one direction only. Each cup support and in turn each cup holder 43 and 43a is rotated by the reciprocating feed pawl 24 whose extension member 24a is also a yieldable member to permit its return after each operative half cycle without reversing the rotation of the cup holder 43 and 43a which is inhibited on alternate half cycles of the pawl arms by the holding spring 59.

Figure 6:
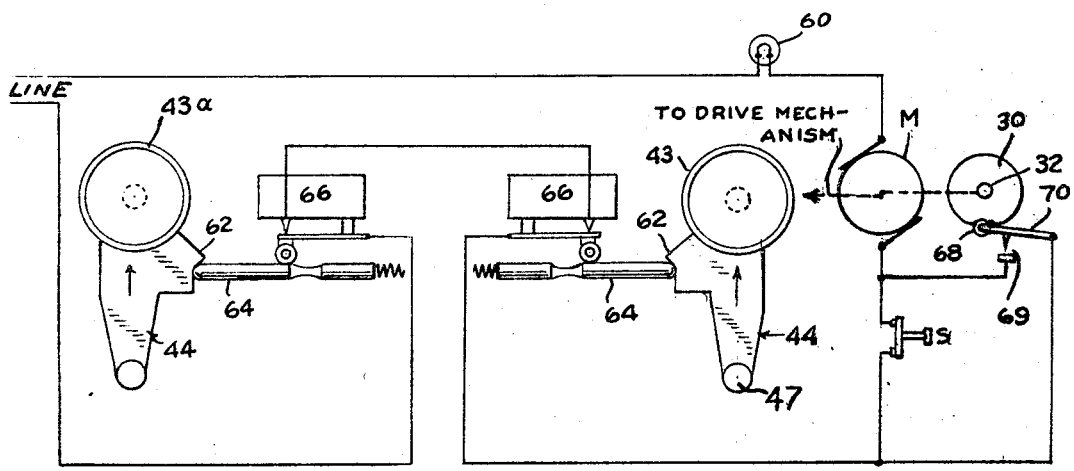
FIG. 6 is a wiring diagram of the control circuit and micro switches shown in FIG. 1.
Figure 7:
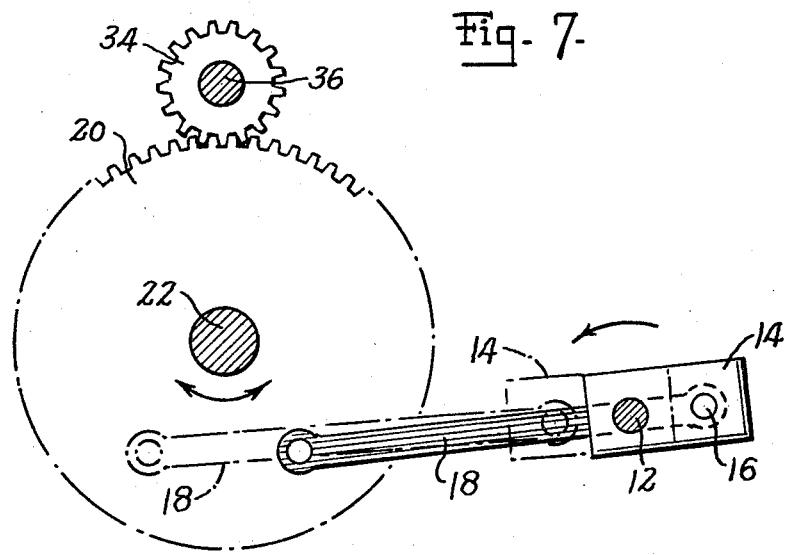
FIG. 7 is a section taken on the line 7—7 of FIG. 1.
Figure 8:
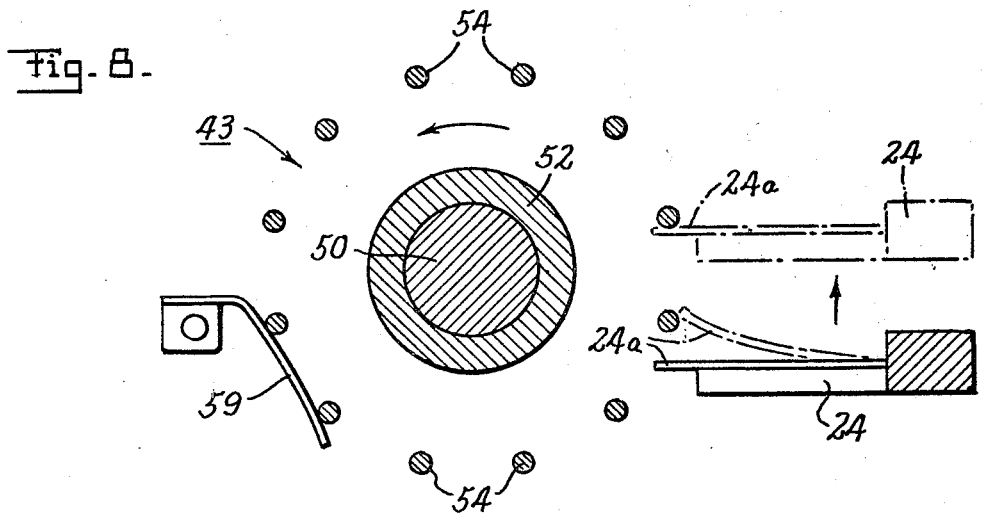
FIG. 8 is a section taken on the line 8—8 of FIG. 1.

Inwardly projecting from each slide 44 is a cam 62 against the cam surface of which there is disposed a spring pressed follower 64. As shown in FIGS. 2 and 6, each cam follower 64 is in control of a micro switch 66. The two switches are shown in series in the line and both have to be closed by sliding in the cup holders 43 by means of handles 47 to the position as shown in FIG. 2 before the motor M can start by closing push button switch S. A signal light 60 in the line is closed as long as the motor M is running. As previously indicated, the motor M drives cam 30 thru ratchet wheel 28 and this cam operates holding switch 69 disposed in parallel with switch S serving to keep the motor running after switch S is opened until the holding switch itself opens when a roller 68 (see FIG. 6) on the free end of arm 70 of the holding switch 69 encounters the dwell in the surface of the cam 30. During one revolution of the cam the cup holders have been turned a revolution and the knives 42 have reciprocated twelve times to effect the desired sectioning of the fruit.

Each cup holder is protected by an arcuate transparent shield 72 during the cutting operation the shield being supported on member 74 secured to the end of arm 76 which is biased into closed position by spring 78. The arm 76 is rotatably mounted on the shaft 36. The member 74 rests on the peripheral top edge of the fruit F within the cup holders, as shown in FIGS. 3 and 4, serving to keep the fruit in place during sectioning.

An additional structure 80 is centrally located and pivotally mounted on the housing 8 and supports a corer 82 which is cylindrical in cross-section and has a sharp peripheral bottom cutting edge 83 which is employed to core the grapefruit prior to sectioning.

The corer is connected to a pivotal block 8a by means of parallel links 86 and is counter-balanced by a spring 84. To secure structure 80 in one of its positions for coring one half of the grapefruit in one holder 43 or the other half of the grapefruit in the other holder 43 a clamping member 87 is provided. Stop pins 88 and 89 are located on the top plate of the housing 8 to insure the proper positioning of the corer in both operating positions.

As grapefruit varies in size, provision is made for replacing grapefruit holders by holders of different sizes. To this end set screw 52a is loosened for the removal of one and tightened on replacement.

Various embodiments of the invention may be effected by persons skilled in the art without departing from the scope and principal of invention as defined in the appended claims.

What is claimed is:

1. In a fruit sectioning device comprising a housing, a motor disposed in said housing, a rotatable cup holder disposed outside the housing, means connected to said motor for intermittently rotating said holder in one direction, a knife disposed outside the housing overlying said holder and means connected to said motor for reciprocating said knife into and out of said holder while said holder is in the stationary phase of its intermittent operation.

2. In a device as defined in claim 1 wherein there is provided a cam driven by said motor and a holding switch controlled by said cam whereby the cup holder is rotated for a preselected number of revolutions and the knife is reciprocated for a preselected number of cycles.

3. In a device as defined in claim 2 wherein a manual switch is disposed in parallel connection with said holding switch.

4. In a device as defined in claim 3 wherein there is provided a micro switch in series with the motor, said cup holder being slidably supported near said housing and having a cam member directed toward said housing and there is a spring pressed cam follower engaging said cam member and in control of said micro switch.

5. In a device as defined in claim 4 wherein a manually operable cylindrical corer is pivotally connected to said housing being depressible over said holder.

References Cited

UNITED STATES PATENTS

| 2,503,097 | 4/1950 | Chavez | 146—3 |
| 2,549,333 | 4/1951 | Polk et al. | 146—3 X |
| 2,879,817 | 3/1959 | Bonnet | 146—94 X |

W. GRAYDON, ABERCROMBIE, *Primary Examiner.*

U.S. Cl. X.R.

146—236